(12) United States Patent
Acedo et al.

(10) Patent No.: US 9,946,493 B2
(45) Date of Patent: Apr. 17, 2018

(54) COORDINATED REMOTE AND LOCAL MACHINE CONFIGURATION

(75) Inventors: Mario Francisco Acedo, Tucson, AZ (US); Ezequiel Cervantes, Tucson, AZ (US); Paul Anthony Jennas, II, Tucson, AZ (US); Jason Lee Peipelman, Vail, AZ (US); Matthew John Ward, Vail, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1767 days.

(21) Appl. No.: 12/062,634

(22) Filed: Apr. 4, 2008

(65) Prior Publication Data

US 2009/0254716 A1 Oct. 8, 2009

(51) Int. Cl.
*G06F 3/06* (2006.01)
(52) U.S. Cl.
CPC .......... *G06F 3/0659* (2013.01); *G06F 3/0604* (2013.01); *G06F 3/067* (2013.01); *G06F 3/0631* (2013.01)
(58) Field of Classification Search
None
See application file for complete search history.

(56) References Cited

U.S. PATENT DOCUMENTS

| | | | |
|---|---|---|---|
| 5,465,359 A * | 11/1995 | Allen et al. | 718/101 |
| 5,819,020 A | 10/1998 | Beeler, Jr. | |
| 6,324,627 B1 | 11/2001 | Kricheff et al. | |
| 6,516,342 B1 | 2/2003 | Feldman et al. | |
| 6,658,590 B1 * | 12/2003 | Sicola | G06F 11/1471 714/15 |
| 6,795,830 B1 | 9/2004 | Banerjee et al. | |
| 6,826,613 B1 | 11/2004 | Wang et al. | |
| 7,028,218 B2 | 4/2006 | Schwarm et al. | |
| 7,149,855 B2 | 12/2006 | Chen et al. | |
| 7,165,160 B2 | 1/2007 | Kodama | |
| 7,266,719 B1 | 9/2007 | LeCrone et al. | |
| 7,302,539 B2 | 11/2007 | Korgaonkar et al. | |
| 7,502,628 B2 | 3/2009 | Imaeda | |
| 7,720,935 B2 | 5/2010 | Anantha | |

(Continued)

OTHER PUBLICATIONS

Lowell, David E. et al., "Devirtualizable Virtual Machines Enabling General, Single-Node, Online Maintenance", ASPLOS 2004, pp. 212-223.

(Continued)

*Primary Examiner* — Edward J Dudek, Jr.
*Assistant Examiner* — Ralph A Verderamo, III
(74) *Attorney, Agent, or Firm* — Griffiths & Seaton PLLC

(57) ABSTRACT

A method, system, and computer program product for coordinating the configuration of local and remote storage subsystems for a local client is provided. A command sender is configured on a local storage subsystem to create remote command objects based on commands received from the local client, and deliver the remote command objects to a remote storage subsystem for execution. A command receiver is configured on the remote storage subsystem, the command receiver service having an interface to receive the remote command objects. A remote connection bucket is configured to manage at least one connection between the local storage subsystem and the remote storage subsystem.

11 Claims, 2 Drawing Sheets

(56) References Cited

U.S. PATENT DOCUMENTS

| | | |
|---|---|---|
| 2002/0049778 A1 | 4/2002 | Bell et al. |
| 2002/0103907 A1 | 8/2002 | Petersen |
| 2003/0009643 A1* | 1/2003 | Arimilli et al. ............... 711/155 |
| 2003/0074529 A1 | 4/2003 | Crohas |
| 2003/0145045 A1 | 7/2003 | Pellegrino et al. |
| 2003/0172146 A1 | 9/2003 | Collins |
| 2005/0015657 A1* | 1/2005 | Sugiura et al. ................... 714/6 |
| 2005/0050292 A1 | 3/2005 | Oh |
| 2005/0091311 A1* | 4/2005 | Lund et al. ................... 709/203 |
| 2005/0114619 A1 | 5/2005 | Matsuo et al. |
| 2005/0154847 A1* | 7/2005 | Trembecki .......... G06F 11/2058 711/162 |
| 2005/0289218 A1* | 12/2005 | Rothman .............. G06F 3/0605 709/203 |
| 2006/0004554 A1* | 1/2006 | Vega et al. ........................ 703/6 |
| 2006/0067208 A1* | 3/2006 | Hoga et al. ................... 370/216 |
| 2006/0161810 A1 | 7/2006 | Bao |
| 2006/0190281 A1 | 8/2006 | Kott et al. |
| 2006/0277383 A1* | 12/2006 | Hayden ................... H04L 69/14 711/170 |
| 2007/0011361 A1* | 1/2007 | Okada et al. ...................... 710/8 |
| 2007/0038748 A1* | 2/2007 | Masuyama ................... 709/225 |
| 2007/0100979 A1 | 5/2007 | Soland et al. |
| 2007/0233992 A1 | 10/2007 | Sato |
| 2008/0005121 A1 | 1/2008 | Lam et al. |
| 2008/0109442 A1* | 5/2008 | Shinohara ........... H04L 67/1097 |
| 2008/0184125 A1* | 7/2008 | Suleiman et al. ............ 715/734 |
| 2008/0270594 A1 | 10/2008 | McJilton et al. |
| 2009/0037424 A1* | 2/2009 | Susairaj et al. ................. 707/10 |
| 2009/0094403 A1* | 4/2009 | Nakagawa et al. ................ 711/6 |
| 2009/0183060 A1* | 7/2009 | Heller et al. ................... 715/202 |

OTHER PUBLICATIONS

Sivathanu, Muthian et al., "Improving Storage System Availability With D-GRAID", ACM Transactions on Storage, vol. 1, No. 2, May 2005, pp. 131-170.

Stewart, Graeme A. et al., "Storage and Data Management in EGEE", Australian Computer Society, Inc., 2007, pp. 69-77.

* cited by examiner

COORDINATED REMOTE AND LOCAL MACHINE CONFIGURATION

CROSS-REFERENCE TO RELATED APPLICATIONS

This application is related to U.S. Non-Provisional Application Ser. No. 12/062,617 and Ser. No. 12/062,619 filed concurrently herewith and incorporated herein by reference.

BACKGROUND OF THE INVENTION

Field of the Invention

The present invention relates in general to computers, and more particularly to a method and computer program product for configuring a virtual array site on a remote server to provide on-demand storage capacity to a customer.

Description of the Related Art

Computers, and accompanying data storage, are commonplace in today's society. Individuals, businesses, organizations, and the like have a need for a certain amount of data storage. Historically, data has been stored on local storage devices, such as tape drives, hard disk drives (HDDs), and removable media such as compact discs (CDs) and digital versatile discs (DVDs). As more of society becomes digital, the need for data storage has generally increased. As the need for data storage and data redundancy has proliferated, storage devices have been implemented in various sites. In some cases, the data storage is maintained in multiple storage servers as part of multiple data storage subsystems.

Occasionally, it is beneficial to be able to redirect commands from one storage server to another. Examples include commands that require configuration commands to be executed on one server, or machine, and the setup of copy services commands on a separate machine. An example of this scenario is a method in which a user requests an offsite machine to be used as a backup for a range of storage volumes. In this case, the user must first open a session to the primary machine, and then query the volumes to be configured. As a next step, the user must open a session to the secondary machine, and configure target volumes (which will be used to hold the backup data) based on the volume attributes retrieved from the primary machine. Finally, the user must open a session again to the primary machine (or reuse the original session) and execute a command that initiates the copy from the source to the target volumes.

SUMMARY OF THE INVENTION

The above describe example expends additional time and resources on the part of a user to perform and manage the various configuration steps. In addition, some configuration scenarios may take additional configuration steps, and would benefit from additional coordination between primary and secondary machine. For example, a user may desire to make identical configurations on two different machines, or may wish to clone a particular configuration from one clone to another. It is desirable to implement a dynamic mechanism to facilitate such configuration scenarios, particularly when the primary machine is local and the secondary machine is remote from a local client.

In light of the foregoing, a method of coordinating the configuration of a local and remote storage subsystem for a local client is provided. A command sender is configured on a local storage subsystem to create remote command objects based on commands received from the local client, and deliver the remote command objects to a remote storage subsystem for execution. A command receiver is configured on the remote storage subsystem. The command receiver service has an interface to receive the remote command objects. A remote connection bucket is configured to manage at least one connection between the local storage subsystem and the remote storage subsystem.

In another embodiment, again by way of example only, a system for providing coordinated local and remote storage capacity to a local client is provided. A command sender is operational on a local storage subsystem. The command sender is adapted to create remote command objects based on commands received from the local client, and deliver the remote command objects to a remote storage subsystem for execution. A command receiver is operational on the remote storage subsystem. The command receiver service has an interface to receive the remote command objects. A remote connection bucket is in communication between the local storage subsystem and the remote storage subsystem. The remote connection bucket is adapted to manage at least one connection between the local storage subsystem and the remote storage subsystem.

In still another embodiment, again by way of example only, a computer program product for coordinating the configuration of a local and remote storage subsystem for a local client is provided. The computer program product comprises a computer-readable storage medium having computer-readable program code portions stored therein. The computer-readable program code portions include a first executable portion for configuring a command sender on a local storage subsystem to create remote command objects based on commands received from the local client, and deliver the remote command objects to a remote storage subsystem for execution, a second executable portion for configuring a command receiver on the remote storage subsystem, the command receiver service having an interface to receive the remote command objects, and a third executable portion for configuring a remote connection bucket to manage at least one connection between the local storage subsystem and the remote storage subsystem.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide mechanisms for coordinating a local and remote storage subsystem for a local client. The mechanisms utilize communication paths between hardware management consoles (HMCs) residing on the local and remote storage subsystems. In one embodiment, a connection path may be defined using an existing Application Programming Interface (API). The mechanisms provide various functionality to facilitate the coordinated configuration of local and remote machines. In some cases, the mechanisms may take the place of additional software applications and provide a more streamlined solution. In one embodiment, the local storage subsystem and/or the remote storage subsystem may be the IBM® System Storage DS8000 series. However, as one skilled in the art will appreciate, various facets of the below-described mechanisms may be implemented in a variety of storage hardware.

Figure 1:
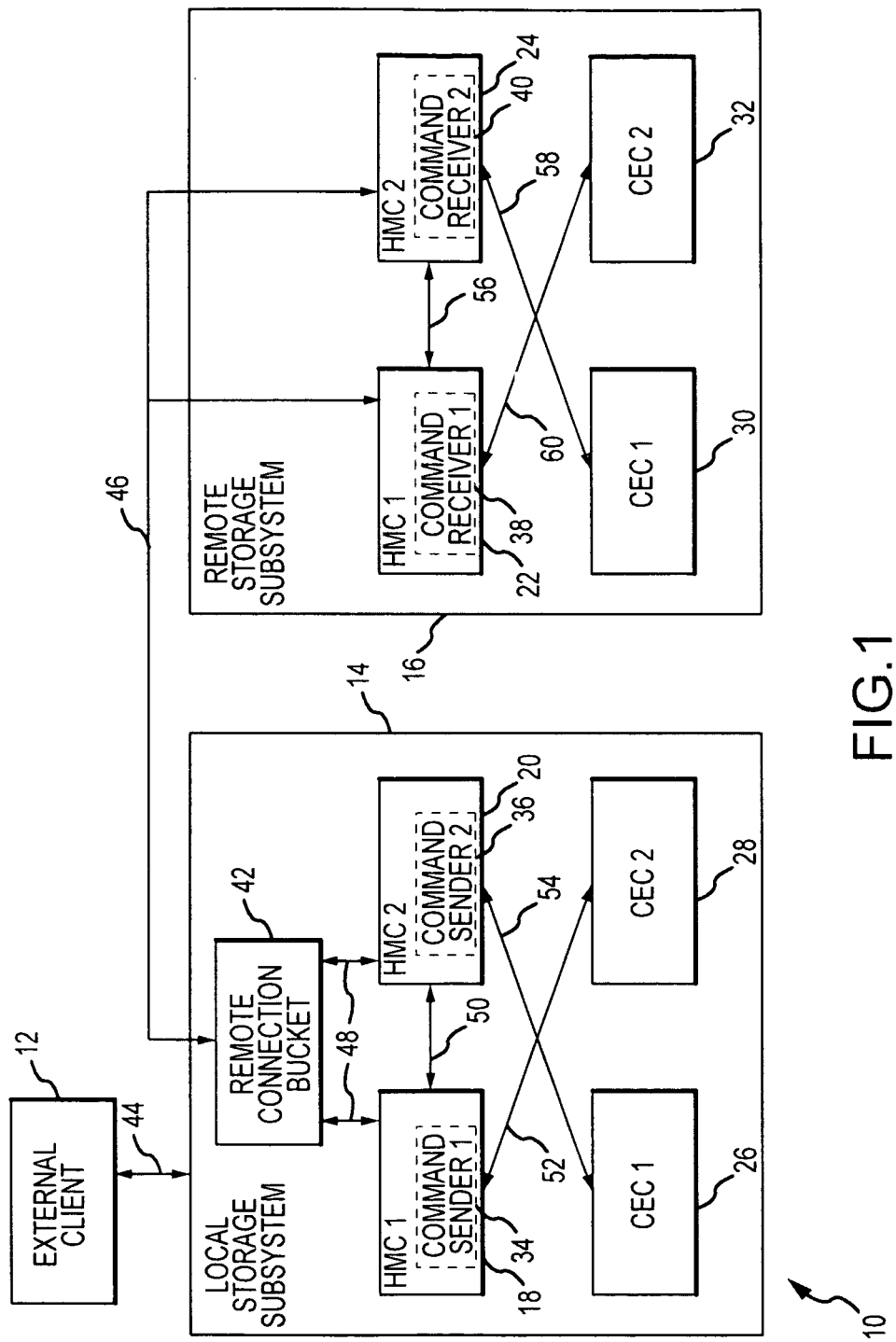
FIG. 1 depicts an example of a data storage system architecture.

FIG. 1 hereafter provides one example of a data storage system architecture in which the mechanisms of the illustrative embodiments may be implemented. It should be appreciated, however, that FIG. 1 is only exemplary and is not intended to state or imply any limitation as to the particular architectures in which the exemplary aspects of the illustrative embodiments may be implemented. Many modifications to the architecture depicted in FIG. 1 may be made without departing from the scope and spirit of the following description and claimed subject matter.

FIG. 1 is an exemplary block diagram of data storage system architecture 10 in which exemplary aspects of an illustrative embodiment may be implemented. As shown in FIG. 1, an external client 12, such as a host computer, a workstation, or the like, is coupled through client communications channel 44 to a local storage subsystem 14. Local storage subsystem 14 provides local storage to the external client 12.

In addition to a local storage subsystem 14, a remote storage subsystem 16 is geographically located remote from the external client 12 and/or the local storage subsystem 14. For example, in a data center environment, a local storage server may be located near the primary place of business of a certain, organization. For redundancy, backup, and security purposes, a remote storage subsystem may be geographically in another state or in a different country.

Each storage subsystem contains hardware management consoles (HMCs). For purposes of convenience and redundancy, two HMCs are shown operational on local storage subsystem 14, although various implementations may include additional HMCs. Likewise, two HMCs are shown operational on remote storage subsystem 16. Local storage subsystem 14 includes local HMCs 18 and 20. Likewise, remote storage subsystem 16 includes remote HMCs 22 and 24.

The Hardware Management Console (HMC) is a system that controls managed systems, including hardware, logical partitions, and the like. To provide flexibility and availability, there are different ways to implement HMCs, including the local HMC, remote HMC, redundant HMC, and a Web-based System Manager Remote Client, for example. A local HMC is one that is physically located close to the system it manages and is connected by either a private or public network. An HMC in a private network may be a Dynamic Host Configuration Protocol (DHCP) server for the service processors of the systems it manages. An HMC may also manage a system over an open network, where the managed system's service processor IP address has been assigned manually using an Advanced System Management Interface (ASMI). For convenience of service personnel, an HMC may be close in proximity to the servers it manages.

A remote HMC is one that is network-connected to a distant managed server or HMC. A redundant HMC manages a system that is already managed by another HMC. When two HMCs manage one system, they are peers, and each can be used to control the managed system. One HMC can manage multiple managed systems, and each managed system can have two HMCs. If both HMCs are connected to the server using private networks, each HMC must be a DHCP server set up to provide IP addresses on two unique, nonroutable IP ranges.

A command sender, one operational on each of the HMCs of the local storage subsystem, is depicted. As a result, HMC 18 includes command sender 34. HMC 20 includes command sender 36. The functionality of command senders 34 and 36 will be further described, following. A command receiver, one operational on each of the HMCs of the remote storage system, is depicted. As a result, HMC 22 as depicted includes a command receiver 38. Likewise, HMC 24 as depicted includes a command receiver 40. Here again, the functionality of command receivers 38 and 40 will be described, following. While command senders 34 and 36 and command receivers 38 and 40 are depicted as integrated within and operational on the various HMCs, the instant depiction is but one possible embodiment. The skilled artisan will appreciate that various modifications to the depicted embodiment may be made, and the command receivers/senders may be operational elsewhere within the local and remote storage subsystems, or elsewhere.

A pair of central electronic complexes 26 and 28 (CEC1 and CEC2) are operational on the local storage subsystem 14 for providing control functionality to the subsystem 14. Similarly, complexes 30 and 32 are operational on the remote storage subsystem 16. A remote connection bucket 42 is operational on the local storage subsystem 14. Remote connection bucket has a plurality of available connections over remote communication channel 46 to the HMCs 22 and 24 of the remote storage subsystem 16. Remote connection bucket 42 is also in communication with the HMCs 18 and 20 of the local storage subsystem 14 via local communications channels 48.

On local storage subsystem 14, HMCs 18 and 20 communicate with each other via connection 50. Cross communication is facilitated between the CECs 26 and 28 and the HMCs 18 and 20 via connections 52 and 54. Similarly, on remote storage subsystem 16, HMCs 22 and 24 communicate via connection 56, and cross communicate between CECs 30 and 32 via connections 58 and 60.

Command receivers 38 and 40 have interfaces that allow a connected client (e.g., external client 12) to deliver command objects. These command objects may be based on command patterns normally used as internal communication objects. The command objects may include internal routing information derived from the command method called and the parameters passed in. The response returned by the command receivers 38 and 40 may then be interpreted by the external client 12 as the same response returned by internal code after a storage command was executed.

Command senders 34 and 36 may be command execution nodes that execute storage command objects given to them. When a new method is called that requires a subcommand to be sent to the remote storage subsystem 16 for execution, the command senders 34 and 36 may create a RemoteCommand as a subtype of Command. The command senders 34 and 36 may also create local command objects for commands that are to be executed on the local storage subsystem 14. Any RemoteCommand objects may be routed internally to the command senders 34 and/or 36. The command senders 34 and 36 then obtain a connection to the remote storage subsystem 16 through the remote connection bucket 42, and send the remote command via this interface.

The response from all local and remote storage activities may then be compiled together by the thread that originated all command objects (remote and local) and an explanation of the action may be provided to a user through a response object created by the local storage subsystem. These explanations may include success/failure notifications, for example.

Remote connection bucket 42 may contain a list of all currently-held connections and their information. For example, user accounts, remote machine information, and the like may be maintained by the bucket 42. If a connection is requested to a machine for a certain user account that the remote connection bucket 42 does not currently have in its list (the account is not listed), the connection may be established using credentials to the remote storage subsystem of the connection request. To reduce the amount of code needed, this connection may use the exact code as an external client 12 would use to connect to a local storage subsystem. As a result, all existing "no single point of failure" code is maintained.

In addition, the remote connection bucket 42 may communicate to an identical object on both HMCs 18 and 20 of the local storage subsystem (if present) so that these connections are redundant and no single point of failure is formed. These connections may be used to send the command to the remote storage subsystem and acquire the resultant response.

Figure 2:
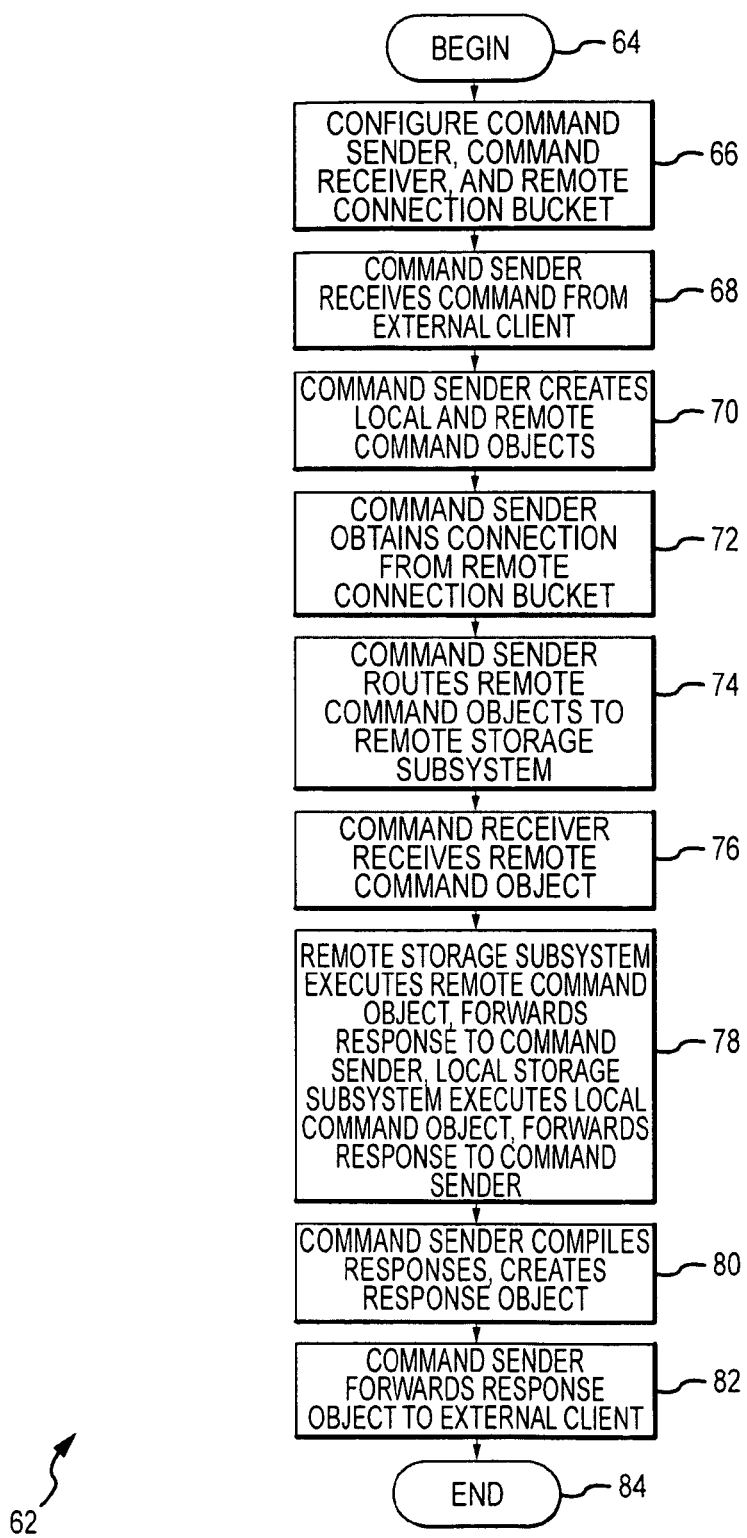
FIG. 2 depicts an exemplary method for coordinating the configuration of a local and remote storage subsystem for a local client.

Turning to FIG. 2, an exemplary method 62 for coordinating the configuration of a local and remote storage subsystem for an external client is illustrated. As one skilled in the art will appreciate, various steps in the method 62 may be implemented in differing ways to suit a particular application. In addition, the described method may be implemented by various means, such as hardware, software, firmware, or a combination thereof operational on or otherwise associated with the storage environment. For example, the method may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Method 62 begins (step 64) with the initial configuration of one or more command senders on the HMCs of the local storage subsystem, one ore more command receivers on the HMCs of the remote storage subsystem, and a remote connection bucket in communication between the HMCs of the local storage subsystem and the HMCs of the remote storage subsystem. For example, a command sender may be configured on hardware management consoles (HMCs) of a local storage subsystem to create remote command objects based on commands received from the local client, and deliver the remote command objects to a remote storage subsystem for execution. A command receiver may be configured on hardware management consoles (HMCs) of the remote storage subsystem, the command receiver service having an interface to receive the remote command objects. Finally, a remote connection bucket may be configured to manage at least one connection between the local storage subsystem and the remote storage subsystem.

As a next step, the data storage system begins operation. The command sender receives a storage command from the external client (step 66). The command sender then creates a local and/or a remote command object from the storage command (step 68) based on a command pattern. The command sender then obtains a connection from the remote connection bucket (step 70). The command sender then routes remote command objects to the remote storage subsystem via the connection bucket (step 72).

In a next step, the command receiver receives a remote command object from the command sender (step 74). The remote storage subsystem executes the remote command object, and forwards a response to the command sender. In similar fashion, the local storage subsystem executes a local command object, and forwards a response to the command sender (step 76).

The command sender compiles all responses from storage actions (local and remote) and creates a response object as previously described (step 78). The command sender then forwards the response object to the external client for processing (step 80). Again, the response object may contain a variety of information. The method 62 then ends (step 82).

While one or more embodiments of the present invention have been illustrated in detail, the skilled artisan will appreciate that modifications and adaptations to those embodiments may be made without departing from the scope of the present invention as set forth in the following claims.

What is claimed is:

1. A method of coordinating the configuration of a local and remote storage system for a local client, comprising:
    configuring a plurality of command senders on a local storage subsystem, each of the plurality of command senders operating within local Hardware Management Consoles (HMCs) comprising Dynamic Host Configuration Protocol (DHCP) servers and each of the local HMCs being a physically separate entity located in close proximity and connected to a local storage system server each respective HMC manages of the local storage subsystem, the HMCs each having maintained Internet Protocol (IP) addresses on two unique and non-routable IP ranges set via the DCHP servers, the plurality of command senders configured for:
        creating remote command objects based on commands received from the local client,
        delivering the remote command objects to a remote storage subsystem for execution,
        compiling storage activity responses generated by the local storage subsystem together with storage activity responses generated by the remote storage subsystem by a thread that originated all remote and local command objects,
        creating a response object from the compiled storage activity responses explaining at least one of a plurality of action notifications including at least a success or a failure notification to provide to a user of the local storage subsystem through a display of one of the local HMCs, and
        forwarding the response object to the local client;
    configuring a plurality of command receivers on the remote storage subsystem, the plurality of command receivers each operating within remote HMCs and including an interface for receiving the remote command objects, each of the remote HMCs being a physically separate entity located in close proximity and connected to a remote storage system server each respective HMC manages of the remote storage subsystem, the HMCs each having maintained IP addresses on two unique and non-routable IP ranges set via the DCHP servers; and
    configuring a remote connection bucket on the local storage subsystem, the remote connection bucket having a plurality of available connections to each of the remote HMCs of the remote storage subsystem, for:
        maintaining a list of a plurality of all currently held connections by a plurality of users associated with the local client, receiving a connection request from the local client, the connection request requesting connection of a user to the remote storage subsystem, determining that the connect request is for an unlisted user in the plurality of users, and in response to determining that the connection request is for the unlisted user, establishing a connection between the unlisted user and the remote storage subsystem, via the remote connection bucket on the local storage subsystem, using a same exact code that the local client would use to establish a connection with the local storage system, wherein:

the remote connection bucket is coupled to the plurality of command senders and to the plurality of command receivers, using the same exact code that the local client would use to establish a connection with the local storage system that is also utilized to connect the unlisted user to the remote storage subsystem, via the remote connection bucket, reduces an amount of code utilized in connecting the local client, the local storage system, and the remote storage system to one another, and configuring the remote connection bucket to establish at least one connection between identical objects in the local storage subsystem and the remote storage subsystem.

2. The method of claim 1, further including configuring the plurality of command senders for:

executing the commands received from the local client, creating local command objects to be executed on the local storage subsystem, and creating the remote command objects to be executed on the remote storage subsystem, the local and remote command objects based on a command pattern.

3. The method of claim 2, further including configuring the plurality of command senders for:

obtaining the at least one connection from the remote connection bucket, and routing the remote command objects through the at least one connection to the remote storage subsystem.

4. A system for providing coordinated local and remote storage capacity to a local client, comprising:

a plurality of command senders operational on a local storage subsystem, each of the plurality of command senders operating within local Hardware Management Consoles (HMCs) comprising Dynamic Host Configuration Protocol (DHCP) servers and each of the local HMCs being a physically separate entity located in close proximity and connected to a local storage system server each respective HMC manages of the local storage subsystem, the HMCs each having maintained Internet Protocol (IP) addresses on two unique and non-routable IP ranges set via the DCHP servers, the plurality of command senders configured for:

creating remote command objects based on commands received from the local client, delivering the remote command objects to a remote storage subsystem for execution, compiling storage activity responses generated by the local storage subsystem together with storage activity responses generated by the remote storage subsystem by a thread that originated all remote and local command objects, creating a response object from the compiled storage activity responses explaining at least one of a plurality of action notifications including at least a success or a failure notification to provide to a user of the local storage subsystem through a display of one of the local HMCs, and forwarding the response object to the local client;

a plurality of command receivers operational on the remote storage subsystem, the plurality of command receivers each operating within remote HMCs and including an interface for receiving the remote command objects, each of the remote HMCs being a physically separate entity located in close proximity and connected to a remote storage system server each respective HMC manages of the remote storage subsystem, the HMCs each having maintained IP addresses on two unique and non-routable IP ranges set via the DCHP servers; and a remote connection bucket on the local storage subsystem that is coupled to and in communication with the plurality of command senders and the plurality of command receivers, the remote connection bucket having a plurality of available connections to each of the remote HMCs of the remote storage subsystem and configured for:

maintaining a list of a plurality of currently held connections by a plurality of users associated with the local client, receiving a connection request from the local client, the connection request requesting connection of a user to the remote storage subsystem, determining that the connect request is for an unlisted user in the plurality of users, and in response to determining that the connection request is for the unlisted user, establishing a connection between the unlisted user and the remote storage subsystem, via the remote connection bucket on the local storage subsystem, using a same exact code that the local client would use to establish a connection with the local storage system, wherein:

using the same exact code that the local client would use to establish a connection with the local storage system that is also utilized to connect the unlisted user to the remote storage subsystem, via the remote connection bucket, reduces an amount of code utilized in connecting the local client, the local storage system, and the remote storage system to one another, and establishing at least one connection between identical objects in the local storage subsystem and the remote storage subsystem.

5. The system of claim 4, wherein the plurality of command senders are further configured for:

executing the commands received from the local client, creating local command objects to be executed on the local storage subsystem, and creating the remote command objects to be executed on the remote storage subsystem, the local and remote command objects based on a command pattern.

6. The system of claim 5, wherein the plurality of command senders are further configured for:

obtaining the at least one connection from the remote connection bucket, and routing the remote command objects through the at least one connection to the remote storage subsystem.

7. The system of claim 4, wherein each command sender is operational on at least one hardware management console (HMC) of the local storage subsystem.

8. The system of claim 4, wherein each command receiver is operational on at least one hardware management console (HMC) of the remote storage subsystem.

9. A computer program product for coordinating the configuration of a local and remote storage subsystem for a local client, the computer program product comprising a non-transitory computer-readable storage medium having computer-readable program code portions stored therein, the computer-readable program code portions comprising:
    a first executable portion for configuring a plurality of command senders on a local storage subsystem, each of the plurality of command senders operating within local Hardware Management Consoles (HMCs) comprising Dynamic Host Configuration Protocol (DHCP) servers and each of the local HMCs being a physically separate entity located in close proximity and connected to a local storage system server each respective HMC manages of the local storage subsystem, the HMCs each having maintained Internet Protocol (IP) addresses on two unique and non-routable IP ranges set via the DCHP servers, the plurality of command senders configured for:
        creating remote command objects based on commands received from the local client,
        delivering the remote command objects to a remote storage subsystem for execution,
        compiling storage activity responses generated by the local storage subsystem together with storage activity responses generated by the remote storage subsystem by a thread that originated all remote and local command objects,
        creating a response object from the compiled storage activity responses explaining at least one of a plurality of action notifications including at least a success or a failure notification to provide to a user of the local storage subsystem through a display of one of the local HMCs, and
        forwarding the response object to the local client;
    a second executable portion for configuring a plurality of command receivers on the remote storage subsystem, the plurality of command receivers each operating within remote HMCs and including an interface to receive the remote command objects, each of the remote HMCs being a physically separate entity located in close proximity and connected to a remote storage system server each respective HMC manages of the remote storage subsystem, the HMCs each having maintained IP addresses on two unique and non-routable IP ranges set via the DCHP servers; and
    a third executable portion for configuring a remote connection bucket, the remote connection bucket having a plurality of available connections to each of the remote HMCs of the remote storage subsystem, for:
        maintaining a list of a plurality of all currently held connections by a plurality of users associated with the local client,
        receiving a connection request from the local client, the connection request requesting connection of a user to the remote storage subsystem,
        determining that the connect request is for an unlisted user in the plurality of users, and
        in response to determining that the connection request is for the unlisted user, establishing a connection between the unlisted user and the remote storage subsystem, via the remote connection bucket on the local storage subsystem, using a same exact code that the local client would use to establish a connection with the local storage system, wherein:
            the remote connection bucket is coupled to the plurality of command senders and to the plurality of command receivers,
            using the same exact code that the local client would use to establish a connection with the local storage system that is also utilized to connect the unlisted user to the remote storage subsystem, via the remote connection bucket, reduces an amount of code utilized in connecting the local client, the local storage system, and the remote storage system to one another, and
            establish at least one connection between identical objects in the local storage subsystem and the remote storage subsystem.

10. The computer program product of claim 9, further including a fourth executable portion for configuring the plurality of command senders for:
    executing the commands received from the local client,
    creating local command objects to be executed on the local storage subsystem, and
    creating the remote command objects to be executed on the remote storage subsystem, the local and remote command objects based on a command pattern.

11. The computer program product of claim 10, further including a fifth executable portion for configuring the plurality of command senders for:
    obtaining the at least one connection from the remote connection bucket, and
    routing the remote command objects through the at least one connection to the remote storage subsystem.

\* \* \* \* \*